V. RAPATTONI.
GROUSER FOR TRACTOR WHEELS.
APPLICATION FILED MAY 29, 1920.
1,403,195.
Patented Jan. 10, 1922.
2 SHEETS—SHEET 1.
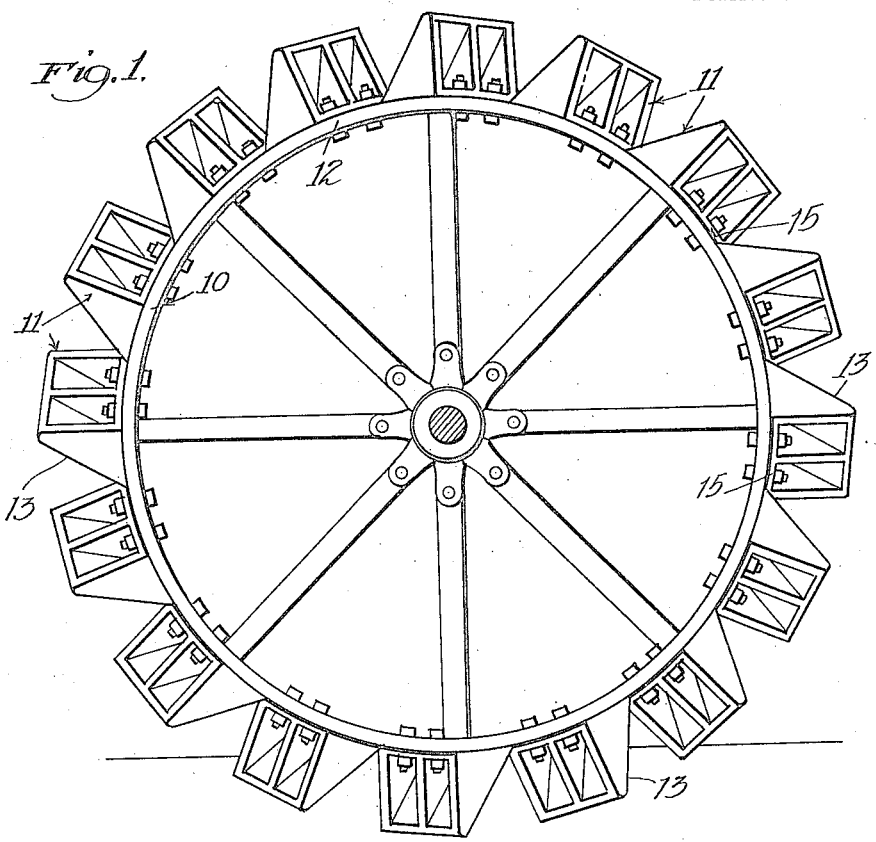
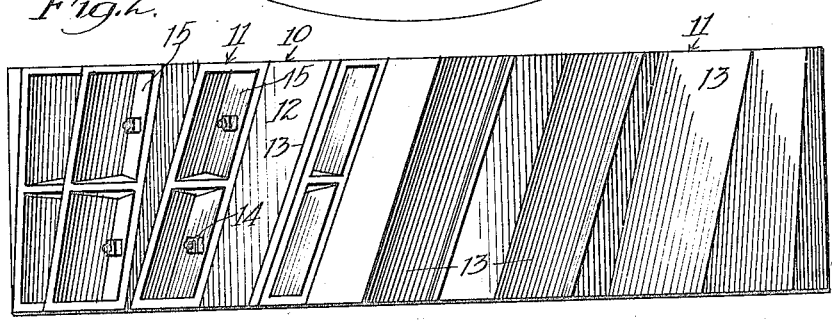
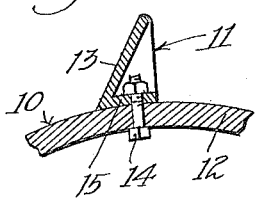 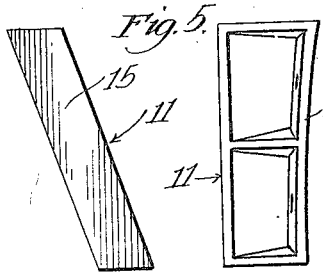 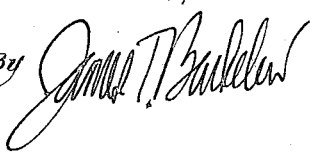
Inventor:
Venturo Rapattoni
By
his Attorneys

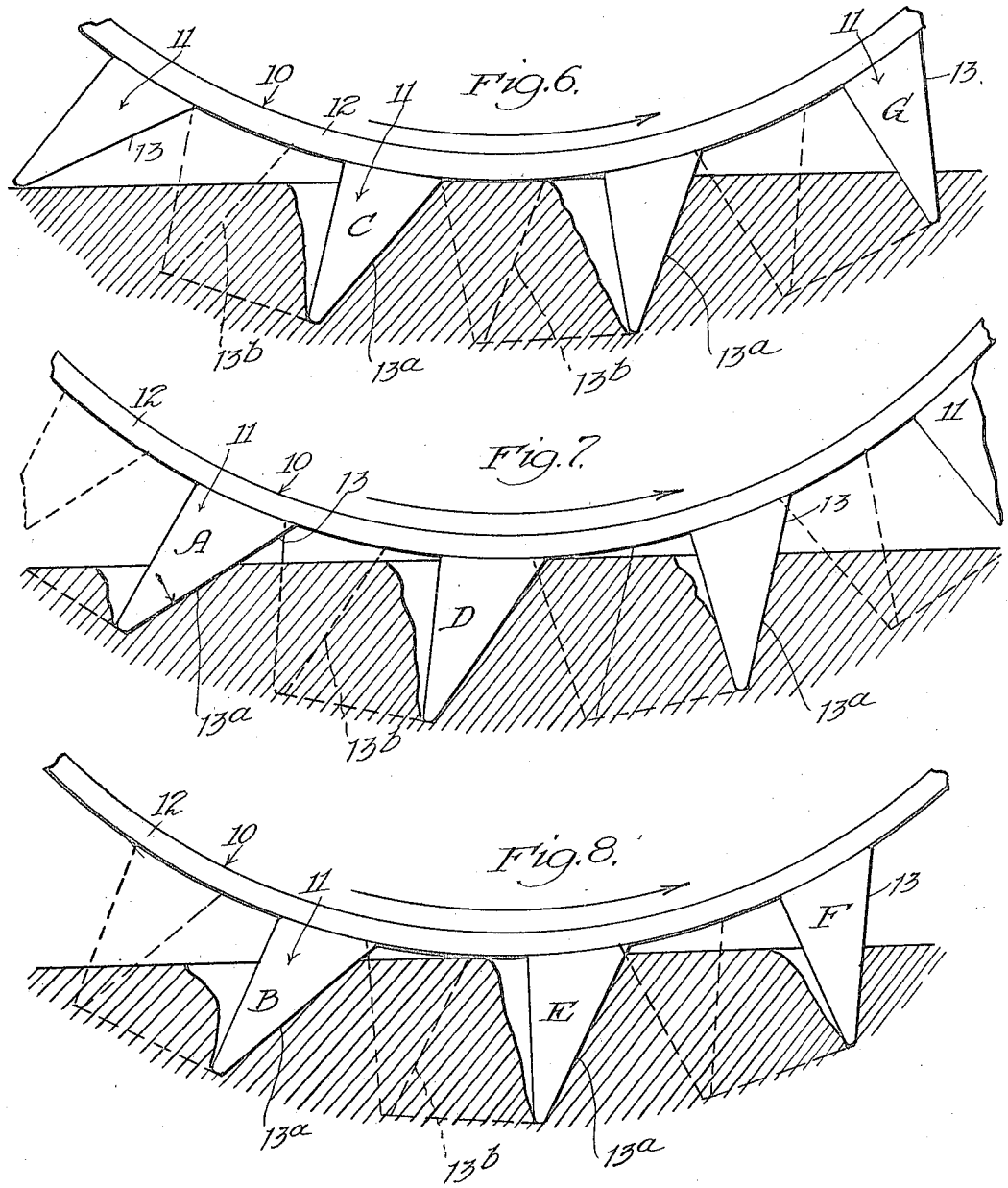

:::::::::::::::::::::::::::::::::::::::::::::::::::::
UNITED STATES PATENT OFFICE.

VENTURO RAPATTONI, OF NEAR CHINO, CALIFORNIA, ASSIGNOR OF ONE-HALF TO JOSEPH INGERSOLL, OF LOS ANGELES, CALIFORNIA.

GROUSER FOR TRACTOR WHEELS.

1,403,195.        Specification of Letters Patent.        Patented Jan. 10, 1922.

Application filed May 29, 1920. Serial No. 385,297.

*To all whom it may concern:*

Be it known that I, VENTURO RAPATTONI, a citizen of the United States, residing near Chino, in the county of San Bernardino, State of California, have invented new and useful Improvements in Grousers for Tractor Wheels, of which the following is a specification.

This invention relates to traction devices for self-propelled vehicles, such as tractors; and the general object of the invention is the provision of a tractor device having a good non-slipping grip upon soil, and particularly upon soft soil. It has heretofore been difficult to provide effective traction devices, particularly for tractors having wheel drives, in soft or sandy soil; and a particular object of my present invention is to provide a traction device applicable particularly to wheeled tractors, and adapted particularly to give effective and sure traction results in soft and sandy soil.

As a result of long consideration of the necessary requirements, and extended experimentations and trials, I have produced a traction device—a wheel grouser—which gives highly efficient results in soft and sandy soil. I have determined that, in order to produce efficient traction results, certain conditions must be met and complied with; and those conditions, as well as the features of my invention, which meet and comply with them, will be best understood from the following detailed description of a specific form of my invention; reference for this purpose being had to the accompanying drawings in which—

Fig. 1 is a side elevation showing a wheel equipped with my improved grousers; Fig. 2 is a plan of the same; Fig. 3 is a section showing the sectional configuration of one of the grousers; Fig. 4 is a bottom plan view of a grouser (showing the face of the grouser which fits against the periphery of the wheel); Fig. 5 is a rear face view of a grouser; and Figs. 6, 7 and 8 are enlarged diagrammatic sections illustrating the action of the grousers in soft soil. In the drawings the numeral 10 designates any typical tractor wheel to which I apply my grousers 11. Fig. 1 shows approximately in proper proportions, the application of grousers to a wheel of typical size. Although relative size is not necessarily a restrictive feature of my invention, I illustrate the grousers in proper proportion, so as to give a clear idea of the practical application of my invention. Thus, in Fig. 1, the grousers are shown in proper proportionate size, and in the number which I have found most efficient, for a wheel of about 42 inch diameter.

The grousers are placed diagonally across the tread face of the wheel; and where the grousers are applied to two traction wheels, they are placed at opposite angles on the two wheels; and preferably the end of the grouser which first comes into contact with the soil is at the inside edge of the wheel. (Figs. 1, 6, 7 and 8 are elevations of the inside face of the wheel.)

The structural formation of each grouser is not of any particular consequence, except as hereinafter described with relation to the ground-engaging face. The diagonal ground-engaging face of the grouser is indicated by numeral 13. The grouser is so constructed as to be of sufficient strength and sturdiness to support the contact face 13 in its working engagement with the soil; and for that purpose I may provide a cast metal grouser of the form shown in the drawings, hollowed and ribbed at its back. This construction affords room for the placement of securing bolts 14, which are passed through the rim 12 of the wheel and through the flange 15 of the grouser.

I have found, by extended experiments and trial, that the best results are had in sandy soil when the angular contact face 13 of the grouser is placed at an angle transverse to the wheel rims as is illustrated in the drawings. This angle (as measured between the face of the grouser and a series of radial lines through the center of the wheel) varies from end to end of the grouser; and this variation is such that all parts of the grouser face parallel to all other parts. This may be best explained by a consideration of Figures 6, 7 and 8. In Fig. 6 the edge line shown at 13ᵃ (the edge line of the contact face at the end of the grouser that makes first contact with the soil) makes an angle with a radius line of about 30°. The line at 13ᵇ (the edge line of the contact face at the end of the grouser that makes last contact with the soil) makes an angle with a radius line of about 20°. But lines 13ᵃ and 13ᵇ are parallel to each other; the contact surface of the grouser is a flat and unwarped surface; and thus the contact face of the grouser will make at all times and regardless of the position of the grouser, the same contact with the ground at one point in that face, as at any other point. In other words, the pressure exerted by the contact face of the grouser upon the soil is in the same direction upon the soil at all points over its face. To accomplish this purpose, the contact face will necessarily make, at different points, different angles with different radial lines; and the difference between these angles with the radial lines will depend upon the angular extent of the grouser around the circumference of the wheel. For instance, in the illustration given in the drawing, the angle between two radii drawn one to the outer point of line 13$^a$ and the other to the outer point of line 13$^b$ is approximately 10°; and this angle is equal to the difference between the two angles which lines 13$^a$ and 13$^b$ makes with the respective radial lines.

By thus providing grousers with flat pressure surfaces, each grouser, as I have said, engages and presses against the soil in the same direction at all points over its surface. Consequently, there is, for each grouser, and for any given position for each grouser a uniform pressure against the soil over all of its surface, or over all of the surface that happens at any one time to be entered against the soil. This kind of action I find to be very efficient and, in fact, it obtains effective results in soft or sandy soil which have been impossible to obtain heretofore with other kinds of grousers. The flat engagement of the grouser surface with the soil decreases the amount of side movement of the soil, and therefore increases the tractive action of the grouser by keeping the soil in position against its pressure surface. Thus, as a grouser enters the soil as shown at A in Fig. 7, it is pressing downwardly and rearwardly against the soil in the direction indicated by the arrow, over all of its surface that is then in engagement with the soil. This direction of pressure is such that the soil will not be displaced rearwardly and upwardly (that is, the engaged part of the soil will not be dug away) but the soil will be packed solidly behind and beneath the engaging face of the grouser. Movement of the soil lengthwise of the grouser (transversely of the wheel) is not induced by the grouser because, as hereintofore explained, the grouser engages the soil at all points, and presses against the soil at all points, in the same direction. Consequently as the grouser proceeds from the position A in Fig. 7, to position B in Fig. 8, the soil will become packed, so that as the grouser reaches position C of Fig. 6, position D of Fig. 7 and position E of Fig. 8, the packed soil will afford a good abutment for the grouser to press against. And even when the grouser reaches its further positions and begins to be withdrawn from the soil, the soil has less tendency to be displaced than it would otherwise have.

Another feature to which attention may be particularly called is this, that the angle made by the grouser face with the soil is such, in any particular size of wheel and relative size of grouser, that when the grouser reaches such a position as indicated at F in Fig. 8 and is being withdrawn from the soil, its pressure face is substantially vertical. The pressure face does not take an angle such as to have a direct and positive tendency to lift the soil until the grouser is practically out of the respective operative contact with the soil (see such a position as shown at G in Fig. 6).

In soft sandy soil the grousers sink into the ground to about the extent illustrated in the drawings, the wheel tread coming down into more or less forcible contact with the soil. In harder soil the grousers of course sink to a lesser extent into the ground. When the wheel travels upon a hard road surface, the outer edges of grousers form a more or less continuous and non-bumping support on account of their angular disposition across the face of the wheel.

While I have described my improved traction device in certain specific form, and have described specific angles and relative sizes and dimensions for the purpose of giving a complete understanding of the invention, it will be readily understood that the invention is not necessarily limited to specific sizes, etc., and that these may be varied to suit different situations, as may be included within the scope of the following claims.

Having described a preferred form of my invention, I claim:

1. In combination with a wheel, a grouser mounted on the wheel tread and extending diagonally across the tread, the grouser having a soil engaging face which stands angularly to a wheel radius drawn through it; such relative angle at the end of the grouser first entering the soil being approximately thirty degrees, and the end last entering the soil being approximately twenty degrees, and the angular extent of the grouser around the wheel being approximately ten degrees.

2. An integral wheel grouser adapted to be secured to a wheel in a diagonal position across its rim, the grouser having a soil engaging face which is unwarped throughout its length, and a substantially spiral face engaging the wheel rim.

In witness that I claim the foregoing I have hereunto subscribed my name this 21st day of May, 1920.

VENTURO RAPATTONI.

Witness:
VIRGINIA BERINGER.